United States Patent
Ingram

(12) 
(10) Patent No.: US 6,532,283 B1
(45) Date of Patent: Mar. 11, 2003

(54) METHOD AND APPARATUS FOR VIEWING REAL TIME TELEPHONE CHARGES

(76) Inventor: Isaac J. Ingram, 555 Richland St., Buford, GA (US) 30518

( * ) Notice: Subject to any disclaimer, the term of this patent is extended or adjusted under 35 U.S.C. 154(b) by 2 days.

(21) Appl. No.: 09/659,467

(22) Filed: Sep. 11, 2000

(51) Int. Cl.[7] .............................................. H04M 15/00
(52) U.S. Cl. ............. 379/130; 379/121.01; 379/114.01; 379/114.03; 379/115.01
(58) Field of Search ....................... 379/114.01, 114.02, 379/130, 114.05, 114.09, 114.08, 114.17, 115.01, 115.02, 121.01, 122, 126, 127.01, 127.03, 127.06

(56) References Cited

U.S. PATENT DOCUMENTS

| | | | |
|---|---|---|---|
| 4,706,275 A | * 11/1987 | Kamil | 379/144 |
| 4,850,007 A | * 7/1989 | Marino et al. | 379/112 |
| 5,303,297 A | * 4/1994 | Hillis | 379/114 |
| 5,400,395 A | 3/1995 | Beremito | |
| 5,506,893 A | 4/1996 | Buscher et al. | |
| 5,608,788 A | * 3/1997 | Demlow et al. | 379/142 |
| 5,692,037 A | 11/1997 | Friend | |
| 5,793,854 A | 8/1998 | Kashipava | |
| 5,862,203 A | 1/1999 | Wulkon | |
| 5,881,139 A | 3/1999 | Romimes | |
| 5,917,897 A | * 6/1999 | Johnson et al. | 379/114 |
| 5,930,343 A | 7/1999 | Vasquez | |
| 6,330,311 B1 | * 12/2001 | Mijares et al. | 379/114 |

* cited by examiner

Primary Examiner—Rexford Barnie
(74) Attorney, Agent, or Firm—Patent Focus, Inc.; Richard C. McComas

(57) ABSTRACT

A communication system for establishing a transparent communication link between a first transceiver and a second transceiver. The communication system in concert with the first transceiver captures and formulates a dedicated communication code intended to represent the second transceiver. Transparent to the user of the first transceiver, the computer system evaluates the communication code and determines whether to transmit the communication code to the Local Exchange Carrier or establish a communication link with an Intelligent Switch, a component of the computer system. When the communication link is established between the computer system and the Intelligent Switch, the Intelligent Switch transmits a communication data packet to the computer system. The communication data packet may, if desired, contain communication transaction rate information, advertisement, or other selected data. The advertisement is displayed to the user of the first transceiver while the computer system maintains a connection to the Intelligent Switch via the Local Exchange Carrier. The transaction rate component of the communication data packet is the current or real-time transaction rate of a selected Long Distance Carrier associated with the Local Exchange Carrier.

1 Claim, 7 Drawing Sheets

Fig. 5

```
03/31/2000
2:00 PM
Monthly Total
10.00
```
— 58

```
Call No. 3
   2:00:00 PM 03/31/2000
Ph. 16075553988
Rate: 0.10
```
— 59

```
2:05:00 PM 03/31/2000
Call Length: 05:03
CUR_CALL    MON_TOT
  0.50         10.51
```
— 60

```
Call 3 Dur:  05:06
2:00:00 PM 03/31/2000
Ph. 16075553988
Rate: 0.10 Tot: 0.51
```
— 61

```
For great books
Go To
www.booksales.com
```
— 62

METHOD AND APPARATUS FOR VIEWING REAL TIME TELEPHONE CHARGES

FIELD OF THE INVENTION

The invention relates, in general, to an apparatus for communication between a communication device and a Local Exchange Carrier's Intelligent Switch. In particular, the invention relates to a computer system having disposed thereon a communication device. The computer system, via the communication device, commands and controls the communication link between the communication device and the Local Exchange Carrier's Intelligent Switch. More particularly the invention relates to a plurality of data structures stored in the computer system's memory wherein the data structures are formulated into instruction modules to direct the functioning of the computer system.

BACKGROUND OF THE INVENTION

The telecommunication industry is replete with communication switching platforms that route, process, and interconnect any one of a plurality of different types of communication devices. The communication devices may be cellular, radiotelephone, analog, or digital transceivers. The switching platforms may include Private Branch Exchanges, Local Carrier Exchanges, and Long Distance Carrier Exchanges. All of these switching platforms are designed and implemented to interconnect a first user or subscriber of a communication device to a second selected user of a communication device. Local and Long Distance Exchange Carriers charge a contracted subscriber a fee to provide services for connecting the subscriber to the second selected user of a communication device.

The fees are derived, in part, from usage of the switching platforms and the local telecommunication service to the subscriber. Typically, the Local and Long Distance Exchange Carriers, in concert with their respective billing offices, compile the fees charged of the subscriber on a monthly basis. The subscriber who desires access to the cost to long distance communication must wait for the monthly bill of services to arrive from the Local or Long Distance Exchange Carriers. The importance of real-time long distance communication awareness is invaluable to the subscriber. For instance the subscriber's billing or invoice cycle may not coincide with the particular Local or Long Distance Carrier billing cycle thereby causing service rendered in one month to be billed in the following month instead of the current month.

In an attempt to resolve the problem of lengthy access time to cost information, U.S. Pat. No. 5,506,893 issued to Buscher et al. on Apr. 9, 1996 discloses a switching platform in communication with an associated billing center to provide current billing information to the subscriber. The subscriber, as delineated in the Buscher et al. patent, places a long distance telephone call through a Local Exchange Carrier. The Local Exchange Carrier connects the subscriber to a selected Long Distance Carrier. If desired, the subscriber may view the call record of the long distance call during the communication link between the subscriber and the subscriber's intended call recipient. The subscriber may, if desired, review the call record during or after the long distance communication link is established. The entire call record is downloaded to the subscriber's communication device. The subtlety of this action on the part of the Long Distance Carrier is the subscriber must first request or place the long distance telephone call to the subscriber's intended recipient. The subscriber receives no call rate or transaction rate information prior to establishing a communication link between himself and the intended call recipient. If the subscriber chooses to compare long distance transaction rates in real-time i.e., at the time the communication link is to be established, he would have to contact or connect to multiple Long Distance Carriers, ergo being charged for the long distance communication link.

In an attempt to remedy the problem of restricting the subscriber as delineated in the Buscher et al. patent U.S. Pat. No. 5,793,854 issued to Kashepva on Aug. 11, 1998 discloses a system for selecting and monitoring telephone rates. The Kashepava patent discloses a communication device associated with a computer system having a database. The subscriber may, if desired, download long distance rate information to the computer system and that computer system stores the information in its database. The user may now review the long distance rates from a plurality of separate Long Distance Carriers. The subscriber may now select the Long Distance Carrier which has the lowest transaction rate for a long distance communication link.

The subscriber, delineated in the Kashepava patent, presumably downloads historical transaction rate data from the Long Distance Carriers and stores the data in an associated database. The subscriber, wishing to establish a long distance communication link, would consult the historical transaction rate records and decide which Long Distance Carrier would provide the best transaction rate for the given time period. If the database records are out of date i.e., the data stored in the database was entered at some selected time period before the current long distance communication link, the subscriber is forced to re-download transaction rate data from all of the selected Long Distance Carriers to update his database to remain current with the latest Long Distance Carrier transaction rate information.

It would be desirable to have a communication device, electrical equipment, or computer system that would provide real-time data to a subscriber who wishes to establish a long distance communication link. The real-time data provided would be the actual transaction rate for establishing a communication link via a selected Long Distance Carrier. The transaction rate data would be as current as the communication link itself i.e., transaction rate data would be concurrent with the subscriber establishing the long distance communication link but prior to the actual establishment of the communication link between the subscriber and the intended recipient of the long distance communication link. The communication device, electrical equipment, or computer system would also provide in-process real-time tabulation of the time and charges of the communication link. The communication device, electrical equipment, or computer system would also enable the subscriber to selectively view long distance time and charges for one or more communication device connected to the computer system. The communication device, electrical equipment, or computer system would further enable the downloading of other types of data and display them to the same communication or transmission medium i.e., telephone line, fiber optic cable, or any other convenient transmission medium. The downloaded data would be selective depending upon which Long Distance Carrier the subscriber chose to establish the long distance communication link.

SUMMARY OF THE PRESENT INVENTION

The present invention is a communication system. The present invention establishes a transparent communication link between a user's transceiver and the end user of the communication link i.e., a second user or a second transceiver. The present invention may, if desired, be self contained in a stand-alone controller or installed on a computer system as a communication application program. The stand-alone controller aspect of the present invention enables the controller to be positioned between the user's transceiver and a Local Exchange Carrier. The Local Exchange Carrier has installed thereto an Intelligent Switch, a component of the present invention.

The computer system having the present invention installed thereon as a communication application program enables the user of the present invention to communicate without utilizing the standard transceiver. For example, the computer system is directly connected to the Local Exchange Carrier. The present invention may, if desired, be activated much like a standard transceiver except the activation involves no physical contact between the user and the present invention. The computer system provides all of the required connections to the Local Exchange Carrier independent of the present invention.

Whether the stand-alone controller or the computer system is selected to implement the present invention, the operational functions remain the same. In operation, the transceiver captures and formulates a dedicated communication code intended to represent the selected recipient's transceiver. Transparent to the user of the transceiver, the present invention evaluates the communication code and determines whether to transmit the communication code to the Local Exchange Carrier or establish a communication link with a selected Intelligent Switch. If the communication code is intended to represent a local or non-toll transceiver number the communication code is transmitted directly to the Local Exchange Carrier. If the communication code is intended to represent a toll transceiver number, the communication link between the present invention and the selected Intelligent Switch is established.

Once the communication code is received by the selected Intelligent Switch, the switch processes the communication code. The Intelligent Switch formulates a communication data packet for transmittal to the stand-alone controller or computer system. The communicating data packet may, if desired, contain communication transaction rate information, a list of area codes, and/or a selected advertisement. The advertisement is displayed to the user of the transceiver or the computer system's monitor while the present invention maintains a connection to the Intelligent Switch. The transaction rate component of the communication data packet is the current or real-time transaction rate of the Long Distance Carrier associated with the Local Exchange Carrier.

Once the transaction rate is received from the selected Intelligent Switch it is processed by the present invention. The process may, if desired, involve storing the transaction rate, area code, or advertisements for future reference, calculating the transaction rate as it relates to time and charges involved in the communication link between the user of the transceiver and the recipient user of the transceiver communication link, or displaying time and charges of the elapsed time period of the aforementioned communication between the user of the transceiver and the recipient user of transceiver communication link.

BRIEF DESCRIPTION OF THE DRAWINGS

The invention is illustrated in the drawings in which like reference characters designate the same or similar parts throughout the figures of which:

FIG. 5 illustrates a block diagram view of the display information of FIG. 3.

DETAILED DESCRIPTION OF THE PREFERRED EMBODIMENT OF THE PRESENT INVENTION

Figure 1:
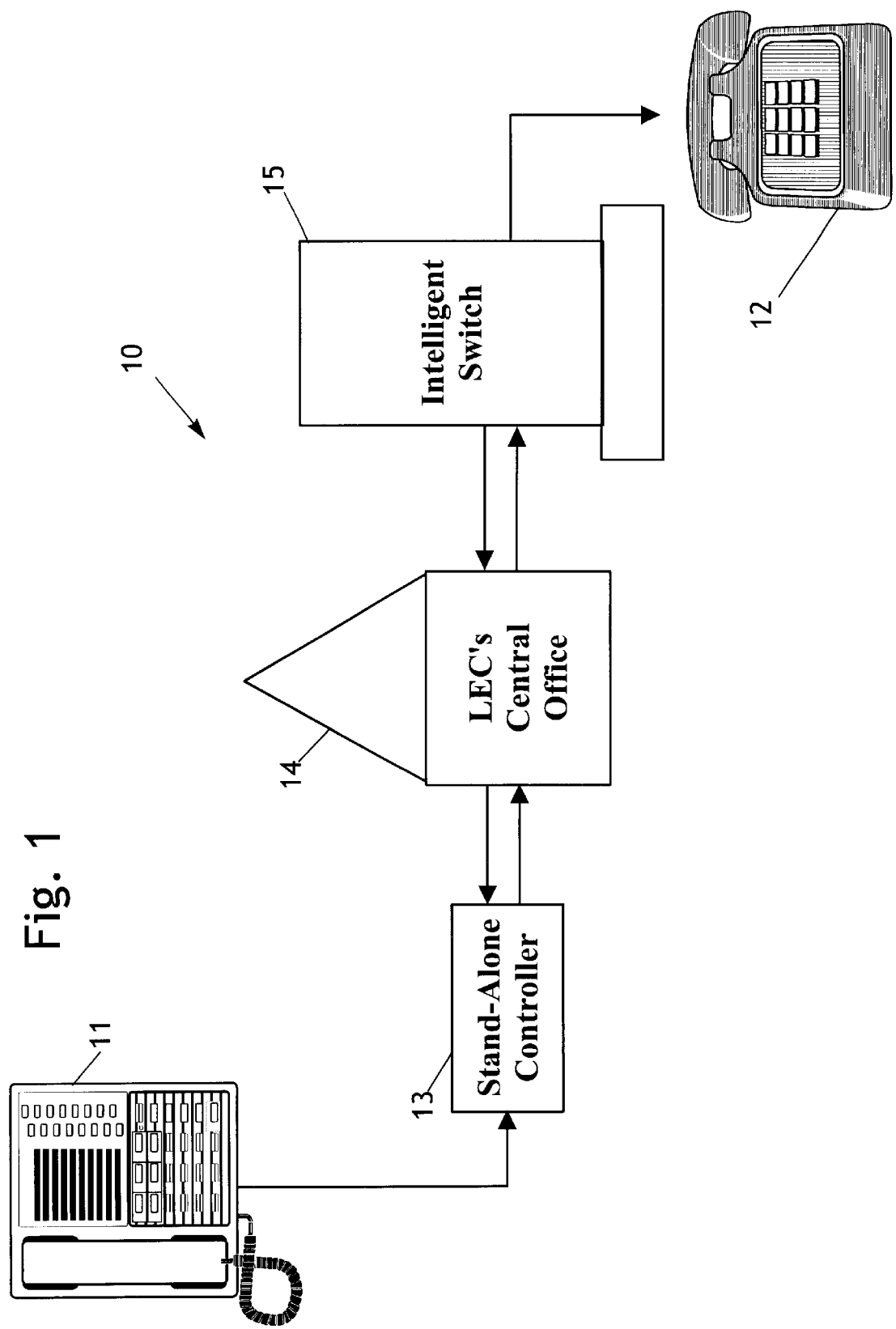
FIG. 1 illustrates a top level block diagram view of the preferred embodiment of the present invention in communication with a Local Exchange Carrier.

Before describing in detail the particular improved communication system between the present invention 10, FIG. 1, Local Exchange Carrier 14, and Intelligent Switch 15 in accordance with the present invention, it should be observed that the invention resides primarily in a novel structural combination of conventional data/signal processing components, associated communication circuits, the command and control of the aforementioned components and circuits, and not in the particular detailed configuration thereof. Accordingly, the structure, command, control, and arrangement of these conventional components and circuits have, for the most part, been illustrated in the drawings by readily understandable block diagram representations and flow charts. The drawings show only those specific details that are pertinent to the present invention 10 in order not to obscure the disclosure with structural details which will be readily apparent to those skilled in the art having the benefit of the description herein. For example, the Local Exchange Carrier 14 has numerous connections to the structure containing the Intelligent Switch 15 and numerous connections to the associated transceivers 11 and 12. Various portions of the interconnections between the aforementioned Local Exchange Carrier 14, Intelligent Switch 15, and transceivers 11 and 12 to the present invention 10 have been simplified in order to emphasize those portions that are most pertinent to the invention. Thus, the block diagram and flow chart illustrations of the Figures do not necessarily represent the mechanical structural arrangement of the exemplary system, but are primarily intended to illustrate major software and hardware structural components of the system in a convenient functional grouping whereby the present invention 10 may be more readily understood.

AN OVERVIEW OF THE PRESENT INVENTION

The present invention 10, FIG. 1 is a communication system. The present invention 10 establishes a transparent communication link between a user's transceiver 11 and the intended user of the transceiver 12. A stand-alone controller 13 having installed therein the present invention 10 may, if desired, be connectively positioned between the transceiver 11 and a Local Exchange Carrier 14. The Local Exchange Carrier 14 has installed therein an Intelligent Switch 15, a component of the present invention 10.

In operation the transceiver 11, FIG. 1 captures and formulates a dedicated communication code intended to represent a selected recipient's transceiver 12. Transparent to the user of the transceiver 11, the present invention 10 evaluates the communication code and determines whether to transmit the communication code to the Local Exchange Carrier 14 or establish a communication link with a selected Intelligent Switch 15. The selected Intelligent Switch 15 is a component of the present invention 10. If the communication code is intended to represent a local or non-toll transceiver number the communication code is transmitted directly to the Local Exchange Carrier 14. If the communication code is intended to represent a toll transceiver number, the communication link between the present invention 10 and the selected Intelligent Switch 15 is established.

The selected Intelligent Switch 15 transmits a communication data packet to the present invention 10. The communication data packet may, if desired, contain communication transaction rate information and/or a selected advertisement. The advertisement is displayed to the user of the transceiver 11 while the present invention 10 maintains a connection to the Intelligent Switch 15 or the Local Exchange Carrier 14. The transaction rate component of the communication data packet is the current or real-time transaction rate of the Long Distance Carrier associated with the Local Exchange Carrier 14.

Once the transaction rate is received from the selected Intelligent Switch 15, FIG. 1 it is processed by the present invention 10. The process may, if desired, involve storing the transaction rate for future reference, calculating the transaction rate as it relates to time and charges involved in the communication between the user of the transceiver 11 and the recipient user of transceiver 12, or displaying time and charges of the elapsed time period of the aforementioned communication between the user of the transceiver 11 and the recipient user of transceiver 12.

The present invention 10, FIG. 1 monitors the connection between the selected Intelligent Switch 15 and the transceiver 12. Once the transceiver 12 is off-hook, a direct connection between the transceiver 11 and transceiver 12 is established. The present invention 10 displays to the user of the transceiver 11 the time and charges for the in-process communication link. After the transceiver 11 is on-hook, the present invention 10 terminates the communication link to the selected Intelligent Switch 15 and displays to the user the final time and charges for the previous communication between the transceivers 11 and 12. If desired, the user may scan the present invention's 10 memory for previously placed communication links to ascertain the total time and charges to any selected communication code.

FUNCTIONAL OPERATION OF THE PREFERRED EMBODIMENT OF THE PRESENT INVENTION

The transceiver 11, FIG. 1 may, if desired, be any type of convenient communication device that permits bidirectional communication. Examples of convenient communication devices are standard push button pulse or tone dialed telephones, digital or analog cellular telephones, and radio-telephones. All of the aforementioned examples of convenient communication devices and the interconnections to the Local Exchange Carrier 14 are well known to an ordinary person skilled in telephone communication technology.

Figure 2:
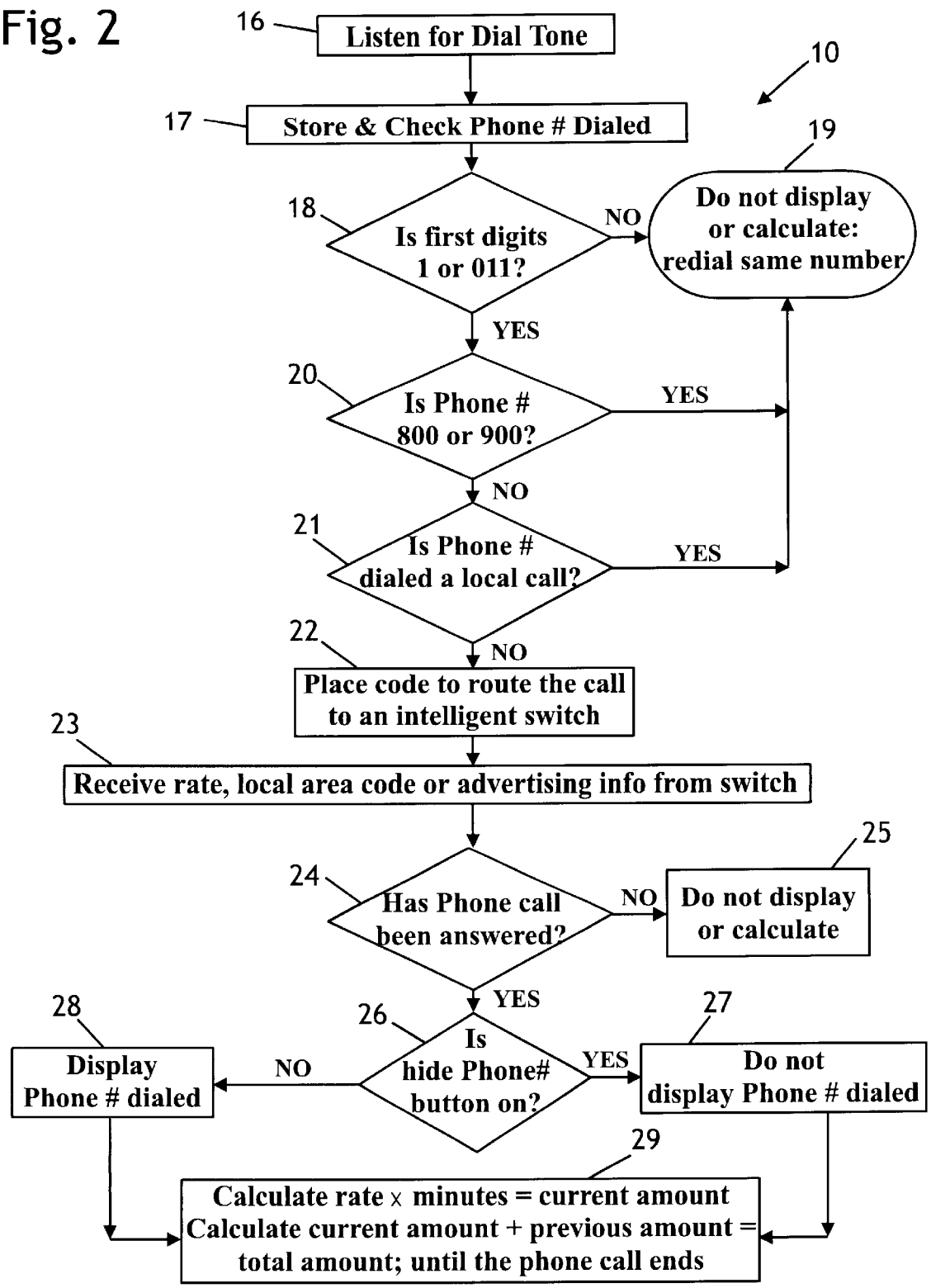
FIG. 2 illustrates a flow chart diagram view of the operational functions of the present invention of FIG. 1.

The present invention 10, FIG. 2 monitors 16 the transceiver 11 to ascertain when the transceiver 11 is off-hook. When the transceiver 11 is off-hook it generates a dial tone that is transmitted to the present invention 10 indicating the user of the transceiver 11 desires to transmit a data packet.

The user of transceiver 11 may, if desired, be an individual or a computer (not shown) connected to the transceiver 11.

The data packet is received and stored 17, FIG. 2 in the present invention's 10 memory (discussed herein). The present invention 10 derives or determines at least one attribute from the data packet. If the first digit 18 of the data packet is not a one (1) or zero (0) the present invention 10 ascertains a non-toll communication link is to be established. The data packet is transformed into a local communication code 19 and the communication link between the Local Exchange Carrier 14 is established. If the first digits 18 of the data packet are a one (1) or zero one one (011), the present invention 10 interprets the subsequent selected attributes of the data packet. If the subsequent selected attributes are interpreted 20 to be a non-toll eight zero zero (800) communication code or a special pay nine zero zero (900) communication code, the data packet is transformed into a character string containing the (1), the (800 or 900) communication codes plus the remaining numbers of the data packet. The character string is transmitted 19 to the Local Exchange Carrier 14 thereby establishing a communication link between the present invention 10 and the Local Exchange Carrier 14.

If the selected attributes are interpreted 21 to be a non-toll one plus (1+) communication code, the data packet is transformed into a character string containing the (1) communication code plus the remaining communication codes of the data packet. The character string is transmitted to the Local Exchange Carrier 14 thereby establishing a communication link between the present invention 10 and the Local Exchange Carrier 14.

The (1+) i.e., (1+ the area code) is required by some Local Exchange Carriers 14 for local non-toll communication links. An example of a Local Exchange Carrier 14 requiring a one plus (1+) character string for a local communication link is New York City. If the communication link is determined to be a non-toll communication code no transaction rates or calculations of time and charges associated with a Long Distance Carrier are displayed for the user to view.

If the selected attributes of the data packet are interpreted to be a toll type communication code, the present invention 10 selects an access attribute 22, FIG. 2 from memory and forms a character string containing the one (1) communication code plus the remaining communication codes of the data packet. The access attribute 22 may, if desired, be any predetermined code that identifies a particular Long Distance Carrier. For example, AT&T Telephone Company may have a one plus eight zero zero (1+800) number that enables the Local Exchange Carrier 14 to route the communication code to AT&T Long Distance. Another example, Vartec Telecommunication has a one zero one zero plus (1010xxx) communication code enabling the Local Exchange Carrier 14 to route the communication code to Vartec Telecommunication.

The communication code is transmitted to the Local Exchange Carrier 14, FIG. 2. The Local Exchange Carrier 14 interprets the communication code as a request for a toll type communication link. The Local Exchange Carrier 14 routes the request for the toll type communication link to the appropriate Long Distance Carrier via the Intelligent Switch 15. The Intelligent Switch 15 in communication with the Local Exchange Carrier 14 receives the communication code and derives a selected transmission rate from the character string of the communication code. The Intelligent Switch 15 has a database (not shown) containing all of the national and international transmission rates. The Intelligent Switch 15 selects an appropriate transmission rate based on the area code portion of the communication code.

The Intelligent Switch 15, FIG. 2 responds to the request for the toll type communication link and forms a communication data packet for transmittal to the present invention 10. The communication data packet may, if desired, contain the selected transmission rate and/or selected advertisement or area code to be displayed to the user of the present invention 10. The selected advertisement may, if desired, be any type of advertisement having commercial value to the Long Distance Carrier. Examples of advertisements include company logos, special promotional information, or public interest information. The transmission of the communication data packet may, if desired, be transmitted by digital or analog means i.e., pulsed tones or carrier wave (compressed or uncompressed). The Intelligent Switch 15 establishes a communication link with the intended recipient of the user via transceiver 12.

The communication data packet is received 23, FIG. 2 by the present invention 10 and parsed into the selected transmission rate and the selected advertisement (if any). The present invention 10 displays to the user the selected transmission rate and the advertisement (if any). The present invention 10 maintains control over the communication link between the user of the transceiver 11 and the user of the transceiver 12.

The present invention 10, FIG. 2 determines 24 if the transceiver 12 is off-hook. If the transceiver 12 is off-hook at the time the communication link is attempted the present invention 10 may, if desired, terminated the communications link between the transceiver 11 and the Local Exchange Carrier 14. The present invention 10 determines 26 if the hide communication code has been activated. If the hide communication code has been activated 27, the communication code is not displayed to the user of the transceiver 11 via the present invention 10. Conversely, if the hide communication code has not been activated 28 the communication code is displayed to the user of the transceiver 11 via the present invention 10.

The present invention 10, FIG. 2 calculates the real time and charges 29 of the communication link between the transceiver 11 and the transceiver 12. The results of the calculation may, if desired, be displayed to the user of the present invention 10 along with the communication code and transaction rate. The present invention 10 may, if desired, formulate daily, weekly, or monthly subtotals regarding the current communication codes or any other selected communication codes that were previously transmitted via the present invention 10.

IMPLEMENTATION OF THE PREFERRED EMBODIMENT OF THE PRESENT INVENTION

Figure 3:
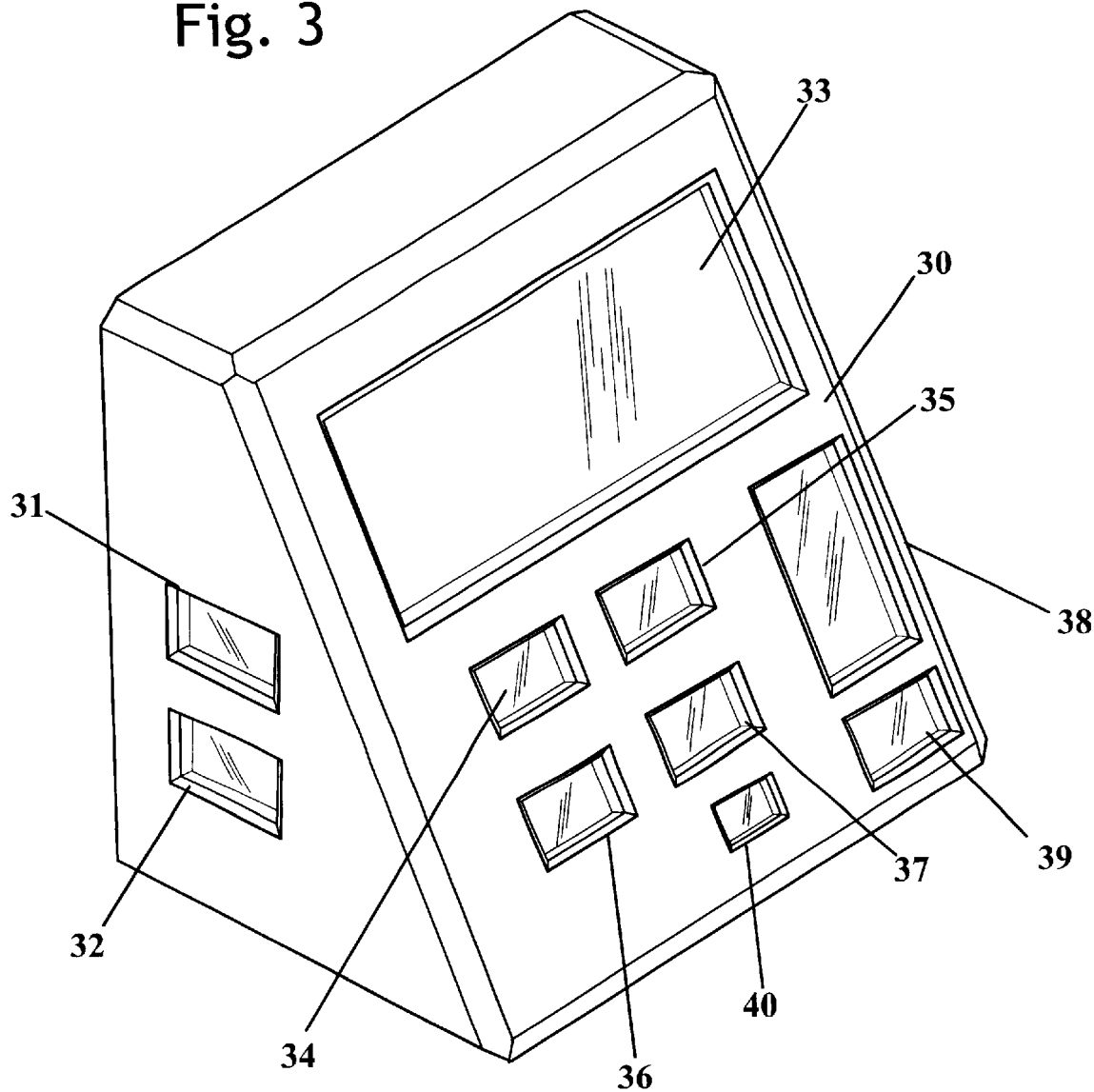
FIG. 3 illustrates a perspective diagram view of the housing, display, and controls of the present invention.

The present invention 10, FIG. 3 may, if desired, by physically contained in any type of medium that enables the present invention 10 to function as delineated above. Examples of mediums to contain the present invention 10 are a dedicated stand-alone controllers stand-alone or an integrated computer systems such as the Dell Dimension Series of computer. The stand-alone controller may, if desired, be any type of microprocessor based system. An example of a typical microprocessor for a stand alone-controller is PIC 16C63A and in tandem PIC 16F877 manufactured by Microchip Company. The microprocessor is interactively connected to a plurality of other integrated circuitry that enables the present invention 10 to command and control the communication link between the transceiver 11 and the Intelligent Switch 15. Examples of integrated circuitry include universal asynchronous receive-transmitter (UART), parallel or serial decoders and numerous types of "glue chips" all of which are well known in the telecommunication technology field. The controller may, if desired, be housed or fabricated into a housing such as housing 30. The housing 30 has a pair of transceiver jacks 31 and 32. Either jack may be configurable into an input type jack or an output type jack that may, if desired, be connected to any telephone system or component thereof. Examples of telephone system components are transceiver answering machines or caller identification controllers. A user viewing display 33 incorporated into the housing 30 provides the user of the present invention 10 with visual indications of the real time calculations of time, charges and selected advertisements from the Intelligent Switch 15. Any type of convenient multi-line, alphanumeric, and/or graphical display known to an ordinary person skilled in telecommunication technology may be used in concert with the present invention 10.

A plurality of viewing display controls may, if desired, be incorporated into the present invention 10. The previous communication link control 34 scrolls through the previous communication during a selected time period. The selected time period may, if desired, be twenty four (24) hours, a week, a month, or any other combination of days or hours. A previous communication link control 34 and a forward control 35 work in concert providing forward and reverse control of the viewing display 33. The previous months' scroll control 36 may, if desired, scroll to the previous months' communication links. The present month control 37 scrolls to the current month of communication links. The hide control 38 enables the user to hide the communication code from the viewing public i.e., the current communication code is not displayed on the viewing display 33.

A program control 39, FIG. 3 may, if desired, be incorporated to provide initial processing control functions for the present invention 10. The program control 39 function in concert with the standard keypad of the transceiver 11 enables the user of the present invention 10 to input the following data: Pressing the program control 39 activates a display request for entry of the identifying communication code of the transceiver 11. Pressing set control 40 stores the identifying communication code in the memory of the present invention 10. Pressing the program control 39 again allows entry of a selected Long Distance Carrier access or communication code to which long distance communication is routed. If desired, a plurality of Long Distance Carrier access codes may be entered in order of priority and the present invention 10 selects the Long Distance Carrier access codes in the order in which they are stored in memory. The program control 39 may, if desired, enable entry of the current time and date by first pressing the program control 39, responding to the displayed request for entry of the time or date then pressing the set control 40. This process of pressing the program control 39, responding, and pressing the set control 40 is repeated for each desired display function.

Figure 4:
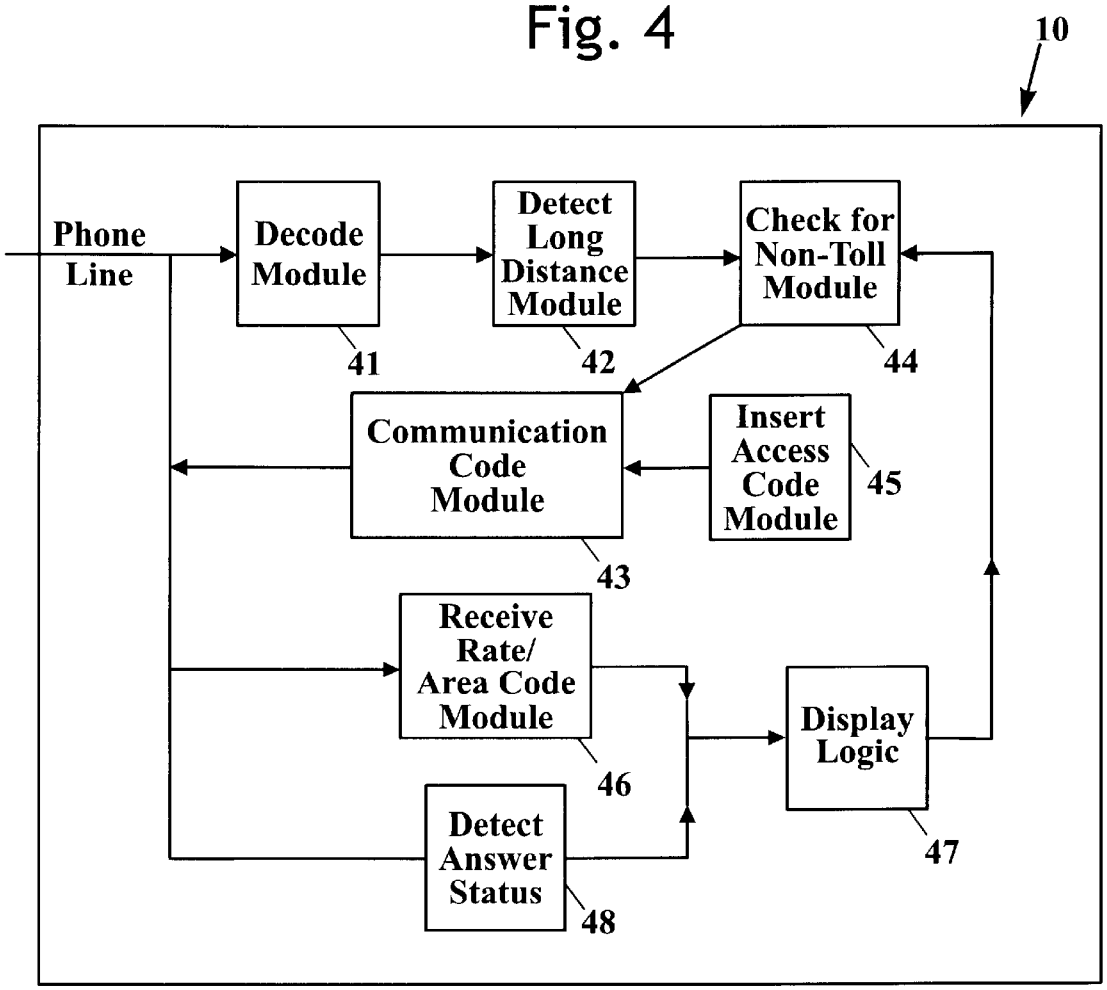
FIG. 4 illustrates a block diagram view of the software modules of the present invention.

The operational functions of the present invention 10, FIG. 4 whether implemented in concert with a stand-alone dedicated controller (as delineated above) or as an application program installed on an integrated host computer system remain the same. The operational functions of the present invention 10 command and control the communication link between the user of the transceiver 11, the Local Exchange Carrier 14, and the Intelligent Switch 15. The present invention 10, in part, is a communication system or program residing in the memory of the stand-alone controller implemented in housing 30 or residing in the memory of the host computer system. The host computer system provides all of the physical connection to the transceiver 11 and the Local Exchange Carrier 14. The Local Exchange Carrier 14 has installed therein the Intelligent Switch 15, a component of the present invention 10. The Intelligent Switch 15 provides transaction rate information and if desired selected advertisements for display to the user of the transceiver 11. The transaction rate information and advertisements transmitted by the Intelligent switch 15 to the stand-alone controller implemented in housing 30 are the same as the transaction rate information and advertisements transmitted to the host computer system.

The present invention 10, FIG. 4 residing in the memory of the host computer memory comprises a plurality of interactive software modules: A Decode Module 41 receives an activation command from the transceiver 11. The activation command may, if desired, be coincident with transceiver 11 being off-hook. The activation command may, if desired, be a detectable frequency, a constant tone, or a digital pulse. The Decode Module 41 responds to the activation command by receiving a data packet from the transceiver 11. The data packet may, if desired, contain a selected character string representing the intended recipient or user of transceiver 12. The data packet may, if desired, be transmitted in dual tone multi-frequency (DTMF) or any other suitable transmission medium. The Decode Module 41 translates or decodes the data packet into a format understood by the host computer system i.e., digital format, and stores the data packet in memory.

A Detect Long Distance Module 42, FIG. 4 in communication with the Decode Module 41 determines the first grouping of characters or the prefix of the data packet. If the prefix is not a one (1) or a zero one one (011) the Detect Long Distance Module 42 ascertains the intended recipient or user of the transceiver 12 is local or non-toll relative to the transceiver 11. The Detect Long Distance Module 42 formulates the data packet into a communication code and transmits the communication code to a Dial Communication Code Module 43. The Dial Communication Code Module 43 establishes a communication link between the Local Exchange Carrier 14, transceiver 12, and the present invention 10. If the prefix is a one (1) or a zero one one (011) the Detect Long Distance Module 42 transmits the data packet to a Check For Non-Toll Module 44.

The Check For Non-Toll Module 44, FIG. 4 is in communication with the host computer's database containing all of the communication codes that require a prefix of one (1) or the zero one one (011) that are non-toll. If a match between the data packet and the stored communication codes requiring a prefix of the one (1) or a zero one one (011) does occur, the desired communication code is a non-toll type. The Check For Non-Toll Module 44 formulates the data packet into a communication code and transmits the communication code to a Dial Communication Code Module 43. The Dial Communication Code Module 43 establishes a communication link between the Local Exchange Carrier 14, the transceiver 12, and the present invention 10.

If a match between the data packet and the stored communication codes requiring a prefix of the one (1) or a zero one one (011) does not occur, the desired communication code is a toll type. The Check For Non-Toll Module 44 transmits the data packet to an Insert Access Code Module 45.

The Insert Access Code Module 45 FIG. 4 in communication with the host computer system's database searches for a predetermined access code. The predetermined access code identifies a selected Intelligent Switch i.e., Long Distance Carrier. The access code has been previously stored in the database by the user of the present invention 10. The Insert Access Code Module 45 prefixes the predetermined access code to the data packet and formulates it into a communication code and transmits the communication code to the Dial Communication Code Module 43. The Dial Communication Code Module 43 establishes a communication link between the Local Exchange Carrier 14 and the present invention 10.

Figure 6:
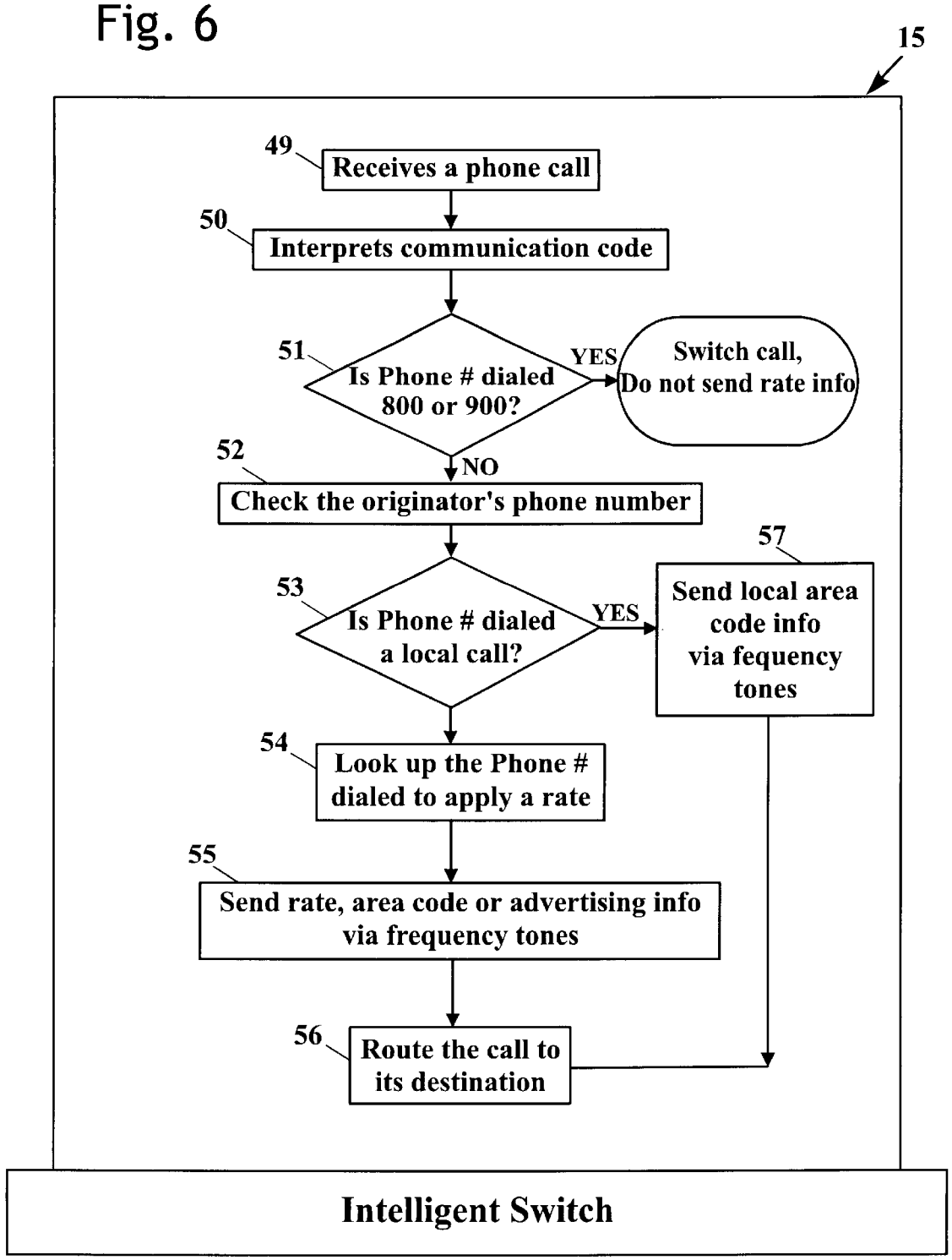
FIG. 6 illustrates a flow chart diagram view of the Intelligent Switch of FIG. 1.

The Intelligent Switch 15, FIG. 6 in communication with the Local Exchange Carrier 14 receives 49 the communication code from the Dial Communication Code Module 43, FIG. 4. The Intelligent Switch 15 interprets the communication code and determines 51 if it is a non-toll long distance communication code or a special pay long distance communication code. An example of a non-toll long distance communication code is an eight zero zero (800) communication code. An example of a special pay long distance communication code is a nine zero zero (900) communication. If the interpretation of the communication code is a non-toll long distance or a special pay long distance communication code, no transaction rate is transmitted to a Receive Transaction Rate/Access Code Module 48 (discussed herein). Intelligent Switch 15 routes the communication code to the appropriate Local Exchange Carrier and the communication link between the present invention 10 and the appropriate Local Exchange Carrier is established.

The Intelligent Switch 15, FIG. 6 determines if the received communication code 52 is non-toll i.e., a one plus (1+) type of communication code by comparing 53 the originating communication code, transceiver 11, to the intended communication code i.e., the intended communication code being the character string identifying the location of transceiver 12. If the comparison yields a non-toll communication code, the Intelligent Switch 15 transmits an indicator 57 back to the present invention 10 indicating the most recent transmitted communication code was interpreted as a non-toll type. The indicator may, if desired, be a portion of the most recent communication code i.e., selected numeric digits prefixing the entered data packet.

The Intelligent Switch 15, FIG. 6 searches its database and obtains the appropriate transaction rate data 54 for the toll type communication code and formulates a communication data packet for transmittal to the Receive Transaction Rate/Area Code module 46, FIG. 4. The Intelligent Switch 15 may, if desired, include in the communication data packet selected advertisements. The selection of the advertisement is based on contractual arrangements between the advertisers Carrier and the owner of the Intelligent Switch 15. The Intelligent Switch 15 routes the communication code to the designated Local Exchange Carrier where the final connection is made to the transceiver 12.

A Receive Transaction Rate/Area Code Module 46, FIG. 4 is in communication with the Intelligent Switch 15. The Receive Transaction Rate/Area Code Module 46 receives the transaction rate indicating the cost of the communication link between the present invention 10 and the intended recipient i.e., the transceiver 12. The Intelligent Switch 15 may, if desired, send selected advertisements for viewing by the user of the present invention 10. The display of the advertisement is under program control and is not displayed until the transceiver 12 is off-hook. The Intelligent Switch 15 may, if desired, send communication code data pertinent to future communication links between the present invention 10 and the Intelligent Switch 15. For example, the database of the host computer system may not have the most current toll/non-toll data thereby the Check for Non-Toll Module 44 may interpret non-toll data for toll data. The transmitting of a toll communication code for a non-toll communication code causes the selected Intelligent Switch 15 to transmit to the Receive Transaction Rate/Area Code Module 46 the portion of the communication code that represents a non-toll communication code.

A Detect Answer Status Module 48, FIG. 4 in communication with the Intelligent Switch 15 polls the Intelligent Switch 15 to determine the status of the communication link. The communication link is in preconnection status i.e., the Intelligent Switch 15 is in process of establishing the communication link between the transceiver 11 and the transceiver 12 or the communication link is established between the transceiver 11 and the transceiver 12. For example, when the Intelligent Switch 15 is in the process of establishing the communication link, the Intelligent Switch 15 transmits a selected indicator to the Detect Answer Status Module 48. Upon receiving the selected indicator, the Detect Answer Status Module 48 transmits the transaction rate data to a Display Logic Module 47. In another example the Intelligent Switch 15 has established the communication link i.e., transceiver 12 is off-hook and the Intelligent Switch 15 transmits a selected indicator to the Detect Answer Status Module 48. Upon receiving the selected indicator, the Detect Answer Status Module 48 transmits the communication code and advertisement (if any) to the Display Logic Module 47. The selected indicators may, if desired, be any type or combination of convenient DTMF tone(s).

The Display Logic Module 47, FIG. 4 commands and controls the display screen 33 or the host computer system's monitor (not shown). The Display Logic Module 47 has logic disposed therein for calculating the time elapsed of the communication link and the cost of the communication link based on the received transaction rate. The Display Logic Module 47 has logic disposed therein to command the display of the communication code, the current time, the current date, elapsed time period of the communication link, and the current time and charges as they accumulated during the elapsed time period. The Display Logic Module 47 may, if desired, have logic disposed therein to command the display of the selected advertisement for the Intelligent Switch 15. The selected advertisements appear on the display screen 33 or the host computer system's monitor when transceiver 11 is in communication with the Intelligent Switch 15 i.e., in-process of establishing the communication link between transceiver 11 and 12. The user of the present invention 10 may, if desired, after receiving and reviewing the transaction rate from the Intelligent Switch 16 terminate the in-process communication link and not suffer economic loss due to this action.

Examples of the Display Logic Module 47, FIG. 4 commanding and controlling the display screen 33 are as follows: A screen display 58, FIG. 5 displays information when the present invention 10 is not activated i.e., the transceiver 11 has not transmitted an activation command. A monitor screen 59 displays the information contained in the data packet transmitted to the Decode Module 41. All or part of the information of the monitor screen 59 may be included in the data packet i.e., time, date, transaction rate, and selected communication code. A screen display 60 provides information in relation to the Detect Answer Status Module 48 verifying the connection to the transceiver 12. The displayed information concerns time, date, time elapse of the communication link, cumulative total of the current communication link, and the monthly total of the communication links in dollars or any other denomination of currency. A screen display 61 provides information concerning individual communication links processed during the previous month. The forward control 35 scrolls forward to allow viewing the communication links. The previous communication link control 34 and the forward control 35 work in concert providing forward and reverse control of the viewing display 33. The previous months scroll control 36 may, if desired, scroll to the previous months' communication links. The present month control 37 scrolls to the current month of communication links. A screen display 62 provides selected advertisements available for the user of the present invention 10 to view. The advertisements may, if desired, time-share other advertisements i.e., the displayed advertisements rotate between at least one other selected advertisements.

Figure 7:
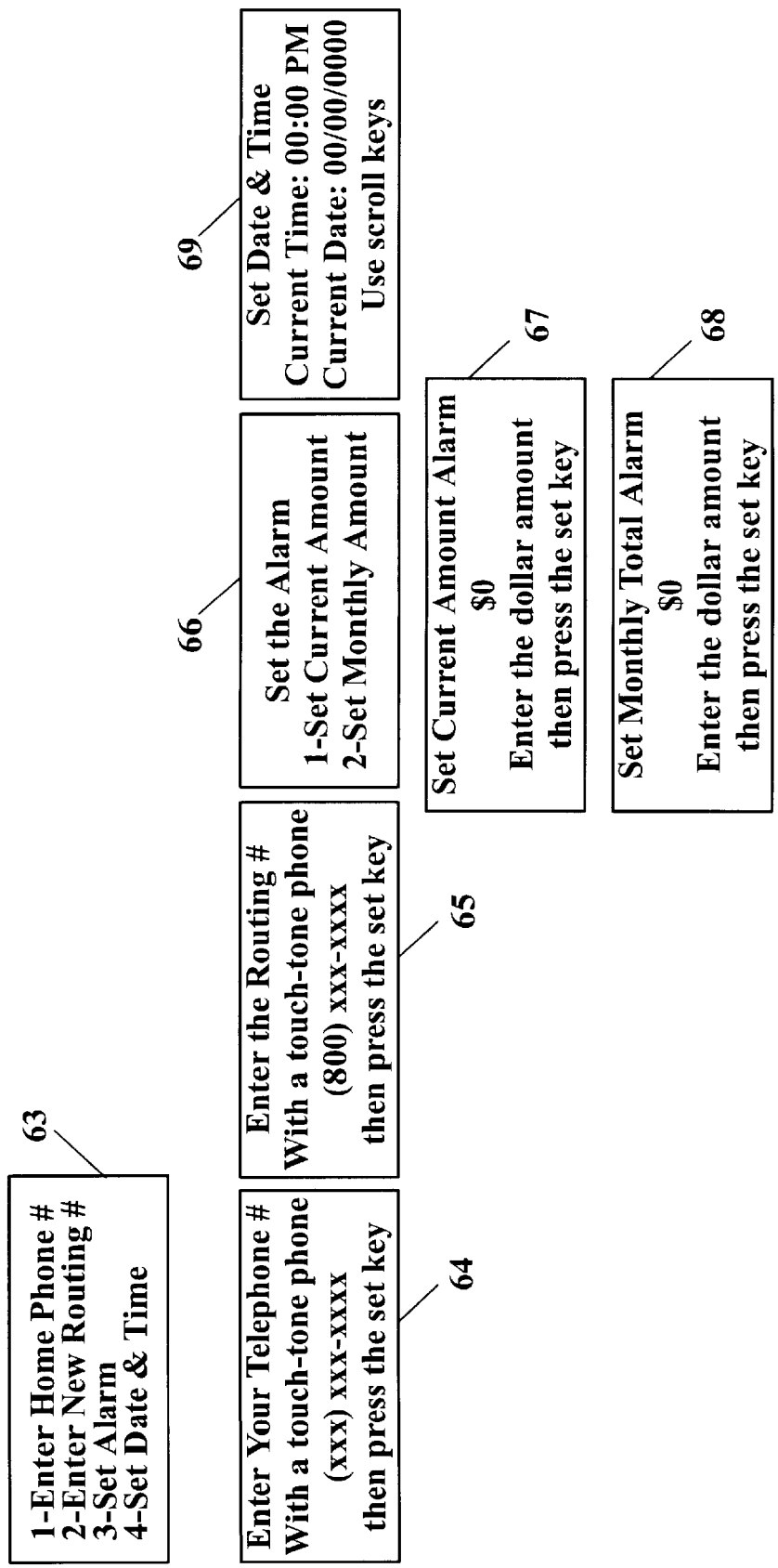
FIG. 7 illustrates a block diagram view of the present invention's programming steps of FIG. 5.

The program control 39, the set control 40, FIG. 3 in concert with the standard key pad of the transceiver 11 and the Display Logic Module 47, FIG. 4 provide information displayed on screen 33, FIG. 3. The information or set control is accomplished during the initial set of the present invention 10 in concert with the transceiver 11. The user of the present invention 10 activates the program set up and a series of informational screens are presented to the user. The first screen that appears tells the user to enter home telephone number, new routing telephone number, set alarm (if desired), and set the time and date 63, FIG. 7. The next screen directs the user to enter the current telephone number 64. If the present invention 10 is implemented in a stand-alone control screen 64 tells the user is told to press the set control 40. The screen 64 begins a tutorial requiring the user to enter selected information and then press the set control 40. This process of the user entering information and pressing the set control 40 continues through screen displays 66 to 69. After the program, setup is concluded the present invention 10 is prepared to accept activation commands from the transceiver 11. If, desired, the present invention 10 program controls may be implemented of the host computer system using standard techniques of data entry known to an ordinary person skilled in the art of computer programming. The present invention may, if desired, be programmed in any suitable programming language known to those skill in the art. An example of that programming language is disclosed in *C Programming Language*, 2/e, Kernighan & Richtie, Prentice Hall, (1989).

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. An apparatus for communicating with a Local Exchange Carrier's Intelligent Switch, the apparatus operationally disposed between the Local Exchange Carrier's Intelligent Switch and a transceiver, the apparatus having a controller with memory operatively disposed therein, the controller in communication with the transceiver, and at least one display device in communication with the controller, comprising:

a) a decoder module stored in the controller's memory, said decoder module in communication with the transceiver, said decoder module interpreting data received from the transceiver;

b) a detect long distance module stored in the controller's memory, said detect long distance module in communication with said decoder module; said detect long distance module receiving said interpreted data, said detect long distance module evaluating the content of said interpreted data;

c) an access code module stored in the controller's memory, said access code module in communication with said detect long distance module, said access code module receiving said evaluated interpreted data, said access code module forming an instruction data set transmittable to the Intelligent Switch;

d) a receiving module stored in the controller's memory, said receiving module in communication with the Intelligent Switch, said receiving module receiving data from the Intelligent Switch; said receiving data module selecting at least one attribute from said received data;

e) a detect answer status module stored in the controller's memory, said detect answer status module in communication with the intelligent switch, said detect answer status module receiving an off-hook indicator from said Intelligent Switch;

f) a display logic module stored in the controller's memory, said display logic module in communication with the detect answer status module, said display logic module receiving said off-hook indicator and said selected attribute, said display logic module transforming said selected attribute and off-hook indicator into a graphic display transmittable to the display device.

* * * * *